US012625761B2

(12) United States Patent (10) Patent No.: US 12,625,761 B2

Deng et al. (45) Date of Patent: May 12, 2026

(54) FAULT REPAIR METHOD AND APPARATUS, ELECTRONIC DEVICE AND STORAGE MEDIUM

(71) Applicant: ZTE CORPORATION, Shenzhen (CN)

(72) Inventors: Senyang Deng, Shenzhen (CN); Lei Shan, Shenzhen (CN); Dongfang Ning, Shenzhen (CN); Zuofeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 182 days.

(21) Appl. No.: 18/693,179

(22) PCT Filed: Sep. 14, 2022

(86) PCT No.: PCT/CN2022/118846

§ 371 (c)(1),
(2) Date: Aug. 17, 2024

(87) PCT Pub. No.: WO2023/056831

PCT Pub. Date: Apr. 13, 2023

(65) Prior Publication Data

US 2025/0217228 A1     Jul. 3, 2025

(30) Foreign Application Priority Data

Oct. 9, 2021     (CN) .......................... 202111177755.5

(51) Int. Cl.
*G06F 11/07* (2006.01)
*H04L 41/0631* (2022.01)

(52) U.S. Cl.
CPC ...... *G06F 11/0793* (2013.01); *G06F 11/0709* (2013.01); *G06F 11/079* (2013.01); *H04L 41/0631* (2013.01)

(58) Field of Classification Search
CPC .............. G06F 11/0709; G06F 11/079; G06F 11/0793; H04L 41/0631; H04L 41/0636
See application file for complete search history.

(56) References Cited

U.S. PATENT DOCUMENTS 9,069,737 B1 * 6/2015 Kimotho .............. G06F 11/079
10,963,333 B1 3/2021 Nijim et al.
(Continued)

FOREIGN PATENT DOCUMENTS

CN 108833187 A 11/2018
CN 110430071 A 11/2019
(Continued)

OTHER PUBLICATIONS (ISA/237) Written Opinion of the International Searching Authority dated Nov. 30, 2022.
(Continued)

*Primary Examiner* — Joseph R Kudirka
(74) *Attorney, Agent, or Firm* — NZ Carr Law Office

(57) ABSTRACT

Embodiments of the present application relate to the field of communications, and discloses a fault repair method and apparatus, an electronic device and a storage medium. The method includes: acquiring a fault feature of a fault; determining whether a fault cause corresponding to the fault feature exists; when a corresponding fault cause does exist, determining whether a repair rule corresponding to the fault cause exists; when a corresponding repair rule does exist, repairing the fault according to the repair rule; and when no corresponding repair rule exists, reporting the fault cause, and after acquiring a repair instruction, repairing the fault according to the repair instruction, and updating a repair rule library.

11 Claims, 6 Drawing Sheets

Internal block diagram of intelligent fault diagnostic system

(56)        References Cited

U.S. PATENT DOCUMENTS

| | | | |
|---|---|---|---|
| 11,204,824 B1 * | 12/2021 | Tiwari ................ | G06F 11/0793 |
| 2004/0225381 A1 | 11/2004 | Ritz et al. | |
| 2014/0177430 A1 | 6/2014 | Hassett | |
| 2017/0161182 A1 | 6/2017 | Yoshida et al. | |
| 2018/0113773 A1 | 4/2018 | Krishnan et al. | |
| 2019/0129788 A1 | 5/2019 | Fields et al. | |
| 2021/0004284 A1 | 1/2021 | Vah et al. | |

FOREIGN PATENT DOCUMENTS

| | | | |
|---|---|---|---|
| EP | 3312725 B1 | 7/2020 | |
| JP | 2004334869 A | 11/2004 | |
| JP | 2017102912 A | 6/2017 | |

OTHER PUBLICATIONS

The international search report of the corresponding PCT Application No. PCT/CN2022/118846 mailed on Nov. 30, 2022 along with English translation thereof.
EESR of the corresponding EP Patent Application No. 22877851.0 dated Nov. 22, 2024.

* cited by examiner

701

Feature module

702

Diagnostic module

703

Repair module

802

Memory

801

Processor

FAULT REPAIR METHOD AND APPARATUS, ELECTRONIC DEVICE AND STORAGE MEDIUM

CROSS-REFERENCE TO RELATED APPLICATIONS

The present application is based on and claims priority to Chinese Patent Application No. 202111177755.5, filed on Oct. 9, 2021, the entire content of which is hereby incorporated by reference into the present application.

TECHNICAL FIELD

The present application relates to the field of communications, and particularly to a fault repair method and apparatus, an electronic device and a storage medium.

BACKGROUND

With the explosive development of information technology, the base station device is evolved from 2G to 5G with higher and higher complexity, the base station device is composed of a large number of working modules, the associative coupling between different modules is tight, the fault of one module often causes a chain reaction, and thus the whole system cannot function properly. Base station devices are often built in high-altitude buildings such as iron towers, and the working environment is harsh, such as extremely hot and cold climate, remote mountainous areas, high altitude areas and other harsh environments. Since base station device troubleshooting generally requires professional instruments and meters, the difficulty and cost of troubleshooting and repairing the base station devices rise sharply.

Therefore, how to break away from the limitation of external instruments and meters, and quickly detect, locate and repair the faults of the base station devices is an urgent problem to be solved.

SUMMARY

An embodiment of the present application provides a fault repair method, including: acquiring a fault feature of a fault; determining whether a fault cause corresponding to the fault feature exists; when a corresponding fault cause does exist, determining whether a repair rule corresponding to the fault cause exists; when a corresponding repair rule does exist, repairing the fault according to the repair rule; and when no corresponding repair rule exists, reporting the fault cause, and after acquiring a repair instruction, repairing the fault according to the repair instruction, and updating a repair rule library.

An embodiment of the present application further provides a fault repair apparatus, including: a feature module, configured to acquire a fault feature of a fault; a diagnostic module, configured to acquire a fault cause of the fault according to the fault feature; a repair module, configured to search whether a repair rule corresponding to the fault cause exists in a repair rule library; repair the fault according to the repair rule if the repair rule exists; report the fault cause if the repair rule does not exist, after acquiring a repair instruction, repair the fault according to the repair instruction, and update the repair rule library.

An embodiment of the present application further provides an electronic device, including: at least one processor; and a memory communicatively connected with the at least one processor; wherein the memory stores instructions executable by the at least one processor, the instructions being executed by the at least one processor to enable the at least one processor to execute the above-described fault repair method.

An embodiment of the present application further provides a non-transitory computer-readable storage medium, storing a computer program which, when executed by a processor, implements the above-described fault repair method.

DETAILED DESCRIPTION

In order to make the object, technical solutions and advantages of the embodiments of the present application more clear, the embodiments of the present application will be described in detail below with reference to the accompanying drawings. However, those of ordinary skill in the art can appreciate that in the various embodiments of the present application, numerous technical details are set forth in order to provide the reader with a better understanding of the present application. However, the claimed technical solution can be implemented without these technical details and with various variations and modifications based on the following embodiments.

The object of the present application is to solve the above problems, and to provide a fault repair method and apparatus, an electronic device and a storage medium, and implement online intelligent diagnosis and repair of the fault of the base station device.

An embodiment of the present disclosure relates to a fault repair method, including: a fault feature of a fault is acquired; whether a fault cause corresponding to the fault feature exists is determined; when a corresponding fault cause does exist, whether a repair rule corresponding to the fault cause exists is determined; when a corresponding repair rule does exist, the fault is repaired according to the repair rule; and when no corresponding repair rule exists, the fault cause is reported, and after a repair instruction is acquired, the fault is repaired according to the repair instruction, and a repair rule library is updated, the embodiment implements online intelligent diagnosis and repair of the fault of the base station device.

The fault repair method of the embodiment of the present application is applied to a base station, wherein the fault repair method of the embodiment of the present application can be implemented by pre-installing a diagnostic system in the base station, and the fault repair method of the embodiment of the present application can be applied to scenarios such as base station device laboratory commissioning, production line production, outside field, and so on.

In the embodiments of this application, the fault feature is acquired in real time to find the corresponding fault cause, and the corresponding repair rule is inquired according to the fault cause, and the fault repair is performed or the repair rule is updated according to the inquiry result. The online intelligent diagnosis and repair of the fault of the base station device are realized, which greatly improves the intelligent level of operation and maintenance of the base station device and the user experience.

The implementation details of a data scheduling method of the present embodiment are specifically described, and the following implementation details are provided only for convenience of understanding, and are not necessary to implement the present solution.

Figure 1:
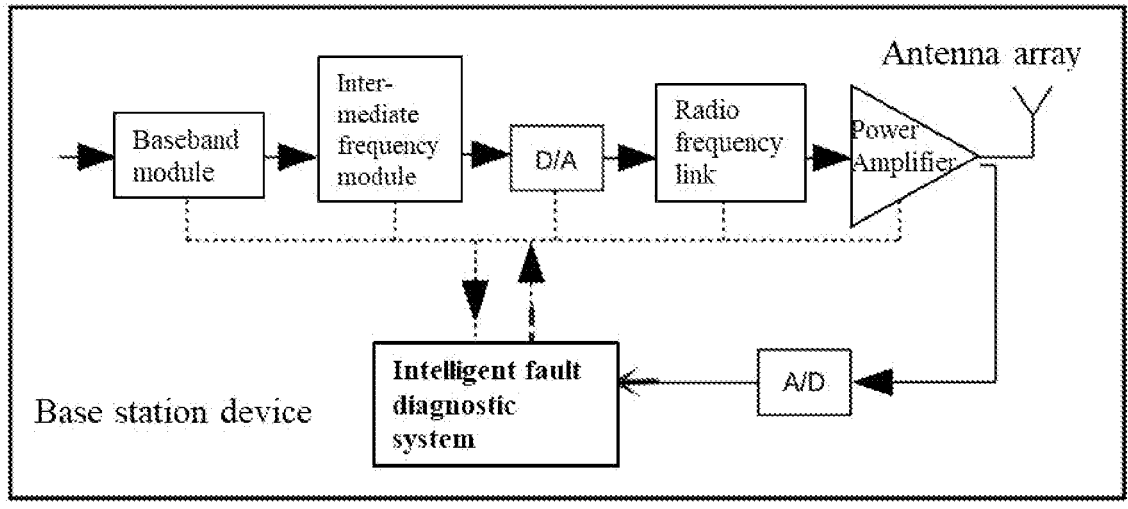
FIG. 1 is a schematic diagram of an internal structure of a base station device according to an embodiment of the present application.

As shown in FIG. 1, in the present application, the base station device is simplified to a baseband module, an intermediate frequency module, a DA/AD module, a radio frequency link, a power amplifier, an antenna array and the like to facilitate online diagnosis. The input to the diagnostic system consists of two parts: one part is the operational state of each module of the base station device, and the other part is a feedback signal from a channel power amplifier port or antenna port, and the output of the diagnostic system is a fault repair instruction and a man-machine interface. The diagnostic system includes feature extraction, rule library, diagnostic reasoning, fault repair, interpreter, and man-machine interaction and other modules; wherein system module input is fault features, key point data, and the like of different modules of RRU (Remote Radio Unit) or AAU (Active Antenna Unit); system output is a root fault cause and a repair instruction.

Figure 2:
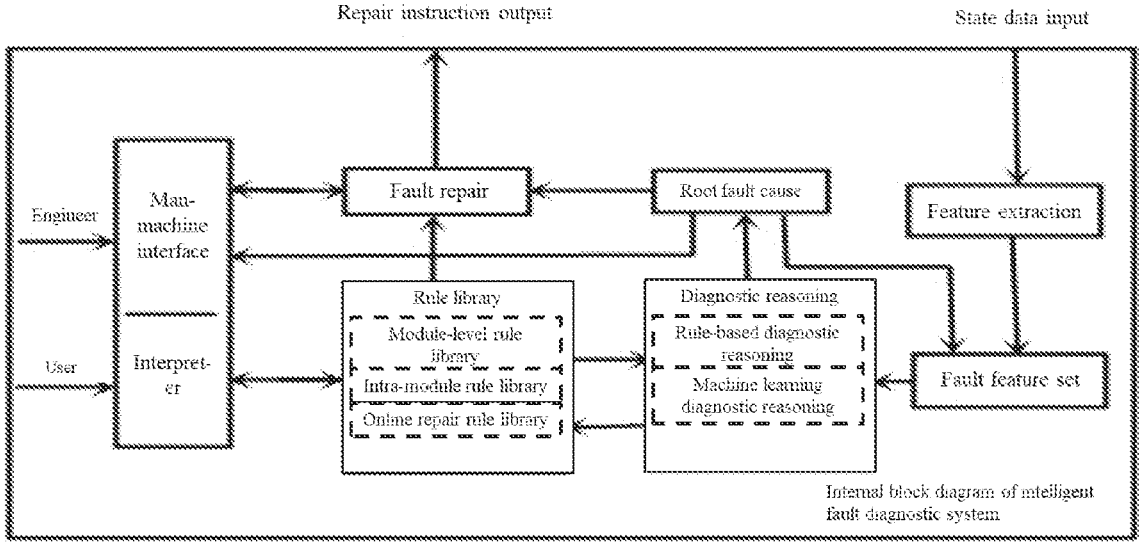
FIG. 2 is an internal block diagram of an intelligent fault diagnostic system according to an embodiment of the present application.

The internal implementation of the intelligent fault diagnostic system is shown in FIG. 2. The diagnostic system can be composed of feature extraction, rule library, diagnostic reasoning, fault repair and man-machine interaction and interpreter modules in FIG. 2:

Wherein, the working principle of the diagnostic system is as follows: the feature extraction module is used to generate a fault feature set, diagnostic reasoning is performed in combination with a rule library, the fault root fault cause is clarified and reported, at the same time the online repair rule library is used to give a fault repair instruction, and finally whether the fault is repaired or not is redetected, and a new round of diagnosis is performed; in the process of rule-based diagnostic reasoning, if it is found that no rule corresponds to the current fault, machine learning diagnostic reasoning is used to generalize and reason the root fault cause, and a fault feature set and a diagnostic result are reported to an engineer for judgment. The engineer gives a new diagnostic result according to the information collected by the diagnostic system and store the result in the diagnostic system to form a repair instruction. Finally, whether the fault is repaired or not is redetected, and a new round of diagnosis is performed. If the fault has been solved, the diagnostic system adds the fault feature set and diagnostic result to the machine learning training sample to generate a new fault rule. Finally, a fault sample with a known root fault cause is used for self-testing. If the self-testing is successful after the new rule is added, the new rule is added to the rule library. Wherein, the root fault cause and process interpretation can be transmitted to the user interface for presentation through the man-machine interface. The specific functions implemented by the various modules are as follows:

Feature extraction: fault feature marks of each module of the base station device are extracted, and are divided into function and performance fault features. The function fault features are marked by key nodes of each module, and the performance fault features need blind identification and calculation of iterative data of each module. The diagnostic system does not need to collect the data of each channel of the base station device, but collects the fault feature reported by each module of each channel.

(2) Rule library: according to the operating principle of the base station device and module division, the mutual influence relationship between fault feature marks of modules, i.e., the rule library is established. In order to further improve diagnostic reasoning efficiency, the rule library establishment adopts the method of separating rules for each module, hierarchically establishing rules within modules, and coordinating rules between modules at the top level. An online repair rule library is added to implement the online repair of the root fault cause.

(3) Diagnostic reasoning: rule-based diagnostic reasoning and machine learning diagnostic reasoning are included. The rule-based reasoning uses forward or reverse reasoning algorithms to reason out a root fault cause based on diagnostic system fault features, a module-level rule library and an intra-module rule library; based on machine learning reasoning, a learning algorithm of low complexity such as decision tree is adopted to perform rule training on a complex fault sample with no explicit rule, and rule self-testing is performed with known root fault cause sample library to supplement new rules into the rule library.

(4) Fault repair: according to the root fault cause and the online repair rule library, it is determined whether the current root fault cause can be repaired online, and if supported, the fault is repaired online.

And (5) Man-machine interaction and interpreter: the fault feature set, the root fault cause, and the reasoning process are explained necessarily, and displayed graphically on the user interface through the man-machine interface, which is convenient for interacting with engineers on one hand and improving user experience on the other hand.

Figure 3:
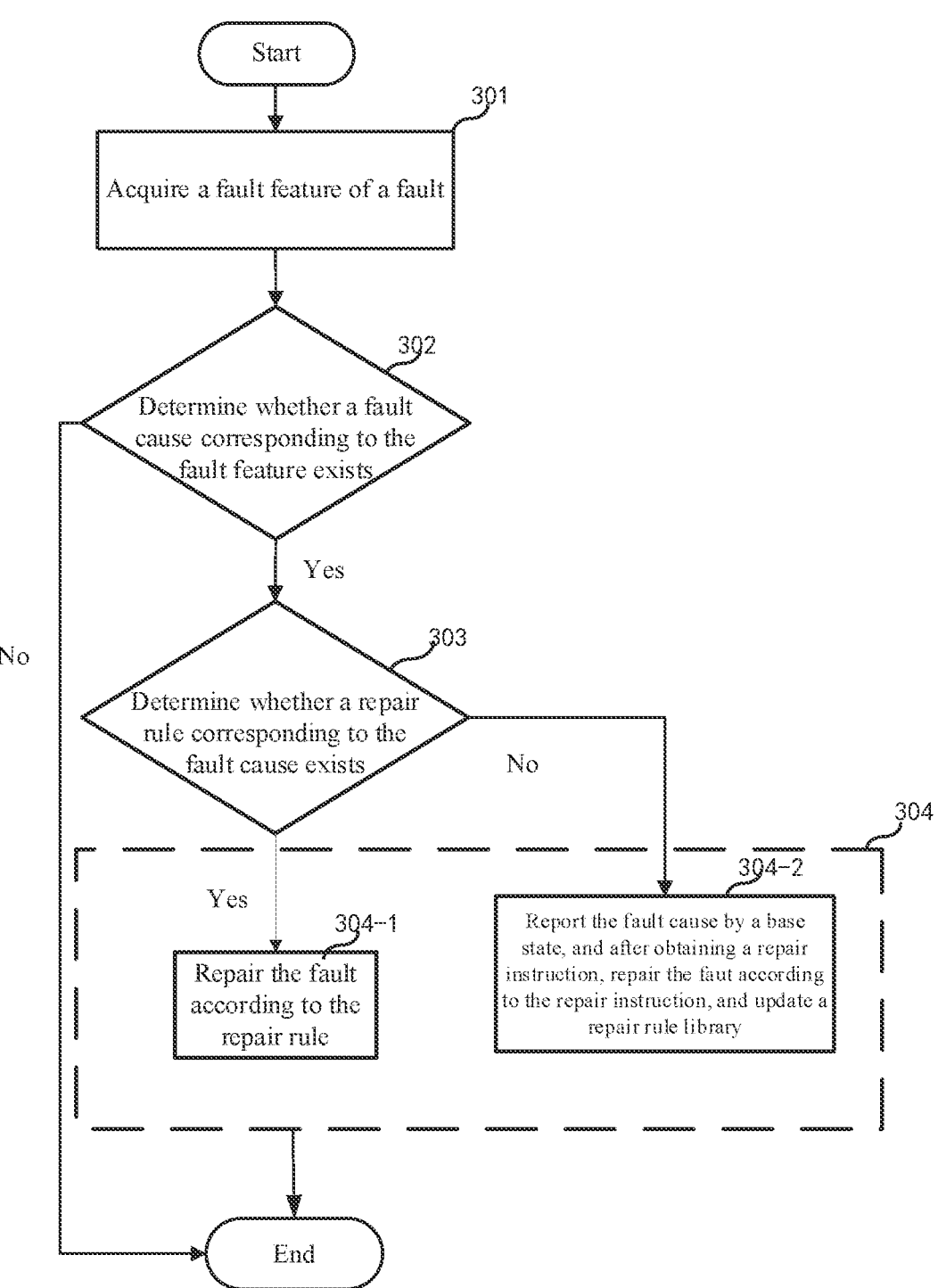
FIG. 3 is a flowchart of a fault repair method according to an embodiment of the present disclosure.

The specific flow of the fault repair method of the present application is shown in FIG. 3, and may include the following steps:

In step 301, a fault feature of a fault is acquired.

Specifically, the base station extracts fault feature marks of each module of the base station device, wherein, the fault features are divided into function and performance fault features. The function fault features are marked by key nodes of each module of the base station device, and the performance fault features adopt blind identification and calculation of iterative data of each module; the function fault feature is configured to represent the hardware state of each device function module; the performance fault feature is configured to represent the signal processing performance of each device function module, wherein the function fault feature can be reported to the diagnostic system by each device function module in real time, and the performance fault feature can be obtained by a detection module in the base station based on the signal processing performance parameter of each device function module.

In one example, the base station first extracts the fault features, and then generates the fault feature set, i.e., fault feature acquisition in the diagnostic system may include basic features are uploaded by each module, the diagnostic system further extracts the basic features, and finally fault features available for the diagnostic system are obtained.

In one example, the base station acquires the performance fault feature by the following mode: the base station acquires a transceiving signal of the device function module; the base station identifies a configuration parameter of the transceiving signal; the base station calculates a performance index of the device function module according to the configuration parameter; and the base station obtains the performance fault feature according to the performance index.

Figure 4:
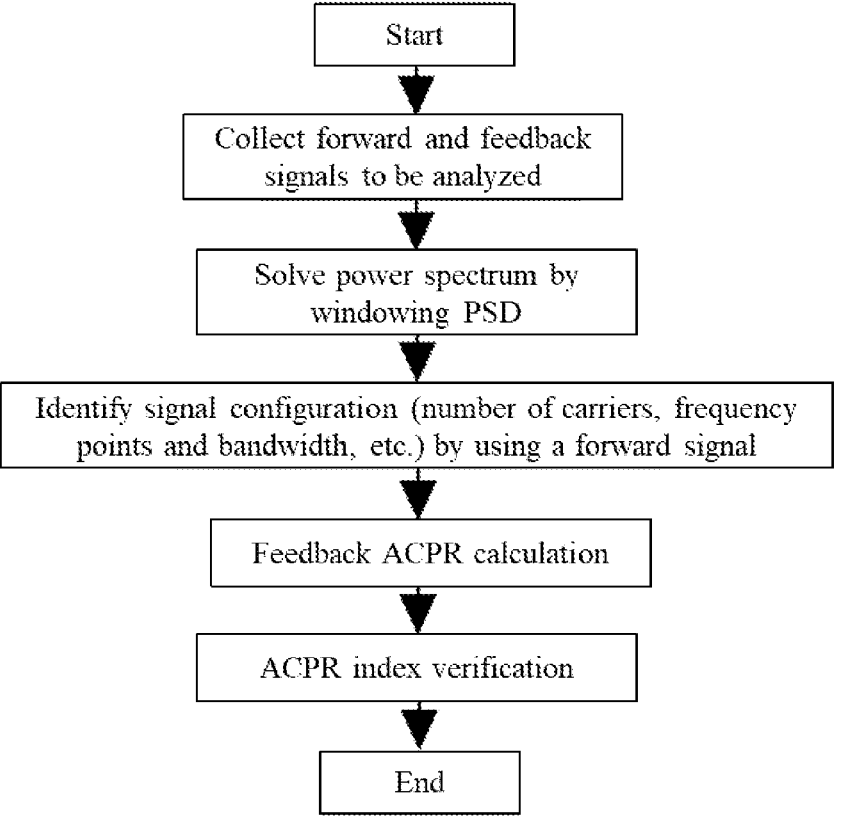
FIG. 4 is a flowchart of an ACPR blind identification method according to an embodiment of the present disclosure.

In one example, the base station extracts the performance fault feature by calculating an ACPR (Adjacent Channel Power Ratio) index. The ACPR blind identification method is shown in FIG. 4, and the specific flow is as follows:

First, an ACPR calculation module needs to blindly identify the signal configuration parameters to be analyzed (number of carriers, frequency points and bandwidth, etc.), that is, the blind identification method: a signal to be analyzed is collected, the data of the signal to be analyzed is windowed, and then a power spectrum is calculated according to PSD (Power Spectral Density), and the number of carriers, the size of the bandwidth, and the carrier frequency point of the signal to be analyzed are determined by setting a power threshold.

Wherein, in order to improve the accuracy of blind identification of multi-carrier unequal power signals, the signals to be analyzed are forward and feedback signals after delay alignment; the forward signal is a signal without nonlinear distortion before a DPD (digital pre-distortion) module of the transmission channel in the base station device, and is used for blind identification of signal configuration parameters; the feedback signal is the signal which is output and coupled back by the power amplifier and includes the nonlinear distortion of the power amplifier for calculating the ACPR index, which measures the degree of single channel nonlinearity; after delay alignment of the forward and feedback signals, the signal configuration parameters identified by the forward signal may be provided for use in feedback signal ACPR calculations.

In addition, the ACPR blind identification calculation can be implemented in an iterative process such as a DPD module of the base station device, and ACPR performance indexes can be reported without separate steps such as sample collection and delay alignment, and without affecting the normal work flow of the base station device.

In one example, the performance index of the base station device may also be an EVM index, an inter-channel amplitude difference, and the like, which may also be used as indexes to measure the performance level of the base station device.

In this embodiment, the method of real-time report of the function fault features and blind identification of the performance fault features can, on the one hand, enable online real-time extraction of fault features out of limits of external instruments and meters, and on the other hand convert a large amount of fault data of the device into fault features in advance, and the fault features are used for transmission between the diagnostic system and the device to be diagnosed, thereby reducing the amount of input data of the diagnostic system. Fault feature extraction breaks away from external restrictions and reduces the amount of transmitted data, which is an important prerequisite for realizing online intelligent fault diagnosis of the base station device.

In step 302, the base station determines whether a fault cause corresponding to the fault feature exists.

Specifically, the base station determines the device function module in which the fault is located; and the base station acquires a fault cause corresponding to the fault feature according to a diagnostic rule corresponding to the device function module in a preset diagnostic rule library, wherein, the diagnostic rule is a correspondence between a fault feature and a fault cause.

Figure 5:
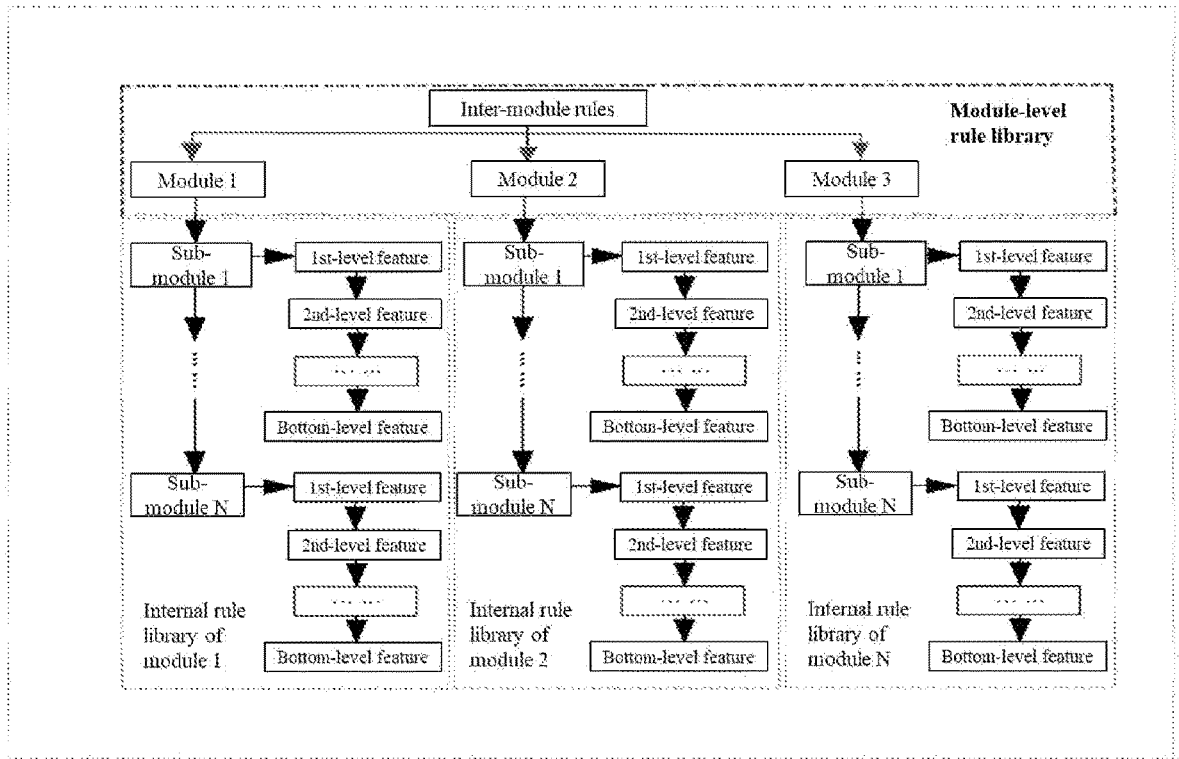
FIG. 5 is a structural schematic diagram of a rule library according to an embodiment of the present disclosure.

In one example, the fault cause of the embodiment of the present application can be derived through rule-based diagnostic reasoning, so it is necessary to build a rule library, which is built using the idea of "separate rules of modules, clear hierarchy of rules within modules", and relationships between modules are established by top-level module-level rules. The specific module divisions and interrelations are established according to the base station device operating principle. In the process of fault diagnostic reasoning, the module where the root fault cause exists is identified by using the module-level rule library, and then the fault module is diagnosed and reasoned, which can avoid the irrelevant module rules participating in fault reasoning and improve the diagnosis efficiency. The structural schematic diagram of the rule library is shown in FIG. 5.

In addition, the rule library of base station devices of the same platform can be shared. If there are some differences among base station devices of different platforms, the modules and the corresponding rules within the modules need only be modified according to the working principle.

In one example, if a rule corresponding to the fault feature exists in the rule library, the base station considers that a fault cause corresponding to the fault feature exists, then step 303 is performed; if no rule corresponding to the fault feature exists in the rule library, then the base station considers that no fault cause corresponding to the fault feature exists, then the base station starts the machine learning diagnostic reasoning to reason out a generalized root fault cause, and reports the fault feature set and the diagnostic result to the engineer for judgment, and the engineer gives a new diagnostic result and stores it to the diagnostic system based on the information collected by the diagnostic system, to form a repair instruction. After the engineer repairs the fault, the diagnostic system adds the new fault feature set and the diagnostic parameters, and finally adopts a fault sample of a known root fault cause to self-test the new rule and the diagnostic parameters, if the self-testing is passed, the new rule is added into the rule library, and the machine learning diagnostic parameters are updated; if the self-testing fails, the machine learning parameters are optimized for retraining. Wherein the root fault cause and the process interpretation are transmitted to the user interface for presentation through the man-machine interface. Wherein, self-testing is carried out after update of rule library to ensure the correctness of the repair rules.

In one example, the decision tree algorithm with low complexity and strong interpretability is selected as the machine learning algorithm (in practical application, it is not limited to the decision tree algorithm, but other machine learning algorithms with low complexity and strong interpretability, such as the vector machine algorithm can also be chosen).

Decision tree is one of intelligent methods based on machine learning theory, which includes decision nodes, branches and leaf nodes. Essentially, we learn from levels of if/else problems and draw conclusions. The branches of the decision tree are equivalent to the fault rules, the attributes and their values along the root node to the leaf node are equivalent to the rule conditions, and the leaf node is the rule conclusion. Decision tree has low complexity, self-learning and certain generalization reasoning ability.

For example, the decision tree C4.5 algorithm uses the information gain ratio as a selection criterion, and the steps of constructing the C4.5 decision tree are as follows:

(1) According to the acquired fault feature set, an information gain and an information gain rate of each feature are calculated, and a feature with a maximum information gain rate is selected as a current fault feature node, and a decision tree root node is obtained.

(2) Recursive operation is performed on a sample subset according to the node attribute that each possible value corresponds to a subset, the process of step (1) is performed until the data in each subset takes the same value on the categorical attribute, thereby generating a decision tree.

(3) Fault rules are extracted according to the constructed decision tree, and a diagnostic self-testing is performed on the new fault feature set. The diagnostic system performs self-test according to an existing rule library or pre-stored fault sample set of known root causes. And (4) on the premise of guaranteeing accuracy, the decision tree structure is simplified by appropriate pruning on the generated decision tree.

Wherein, the information entropy is:

$$I(C) = -\sum_{i=1}^{m} P(C_i)\log_2(P(C_i))$$

wherein, $P(C_i)$ is the proportion of samples belonging to $C_i$ in the total samples in m categories, if the total number of samples is S, the number of samples belonging to the category $C_i$ is $S_i$, then $$P(C_i) = \frac{S_i}{S}.$$

An attribute A conditional entropy is expressed as:

$$E(A) = -\sum_{j=1}^{n} P(A_j)\sum_{i=1}^{m} P(C_i|A_j)\log_2(P(C_i|A_j))$$

Wherein $P(A_j)$ is the proportion of samples in which the attribute A value is $A_j$ in the sample set, and $P(C_i|A_j)$ is the proportion of samples in which the category belongs to $C_i$ in the sample set with the attribute $A_j$.

By calculating the information entropy and the conditional entropy, the information Gain(A) of the attribute A can be obtained:

$$\text{Gain}(A)=I(A)-E(A)$$

The information gain ratio is:

$$GainRatio(A) = \frac{\text{Gain}(A)}{I(A)}.$$

In the above diagnostic reasoning method, a machine learning algorithm with lower complexity, strong interpretability, and suitable for small sample size is adopted to replace the neural network algorithm, and the problem that it is difficult for a complex algorithm such as a neural network algorithm to implement online diagnostic reasoning at the base station device is solved, thereby implementing functions such as online self-learning and self-testing of troubleshooting rules.

In step 303, when a corresponding fault cause exists, the base station determines whether a repair rule corresponding to the fault cause exists.

In one example, the base station, before judging whether a repair rule corresponding to the fault cause exists, determines a root fault cause based on rule-based diagnostic reasoning, wherein the reasoning algorithm used in rule-based diagnostic reasoning adopts a traditional forward reasoning algorithm, the fault feature set of the base station device is matched with the rule library, and the successfully matched rules are retained until all the rules in the rule library to be matched are matched, and finally the retained rules can diagnose the root fault cause.

In particular, the base station determines whether the root fault cause can be repaired online according to the online repair rule library after defining the root fault cause through rule-based diagnostic reasoning, i.e., determines whether a repair rule corresponding to the fault cause exists.

In step 304, when a corresponding repair rule does exist, the base station repairs the fault according to the repair rule, i.e., performs step 304-1; when no corresponding repair rule exists, the base station reports the fault cause, after acquiring the repair instruction, according to the repair instruction, repairs the fault, and updates the repair rule library, i.e., performs step 304-2.

In one example, if the fault cause has no corresponding repair rule, the root fault cause is reported to a man-machine interface, and prompted to an engineer through a user interface, the engineer performs repair according to the root fault cause, and the repair rule of the root fault cause is updated into an online repair rule library after the repair succeeds.

The embodiment of the present application employs a man-machine interface to display the whole fault situation of RRU or AAU in an interface, so that the faults or potential faults of each module of the base station device can be seen at a glance, and the user experience is greatly improved.

The embodiment of the application mainly combines fault diagnosis with artificial intelligence technology, and provides a method for intelligent fault diagnosis of the base station device, which can break away from the limitations of external environment, instruments and meters, realize the functions of online diagnosis, prediction and repair of base station device faults, and has the functions of online self-learning and self-testing, thus greatly improving the intelligent level of operation and maintenance of the base station device and the application range of intelligent fault diagnosis of the base station device. Because the embodiment of the application can realize the online intelligent diagnosis and repair of the base station device fault, and also has the functions of online self-learning and self-repair, the requirements for the network environment and the like are low.

Figure 6:
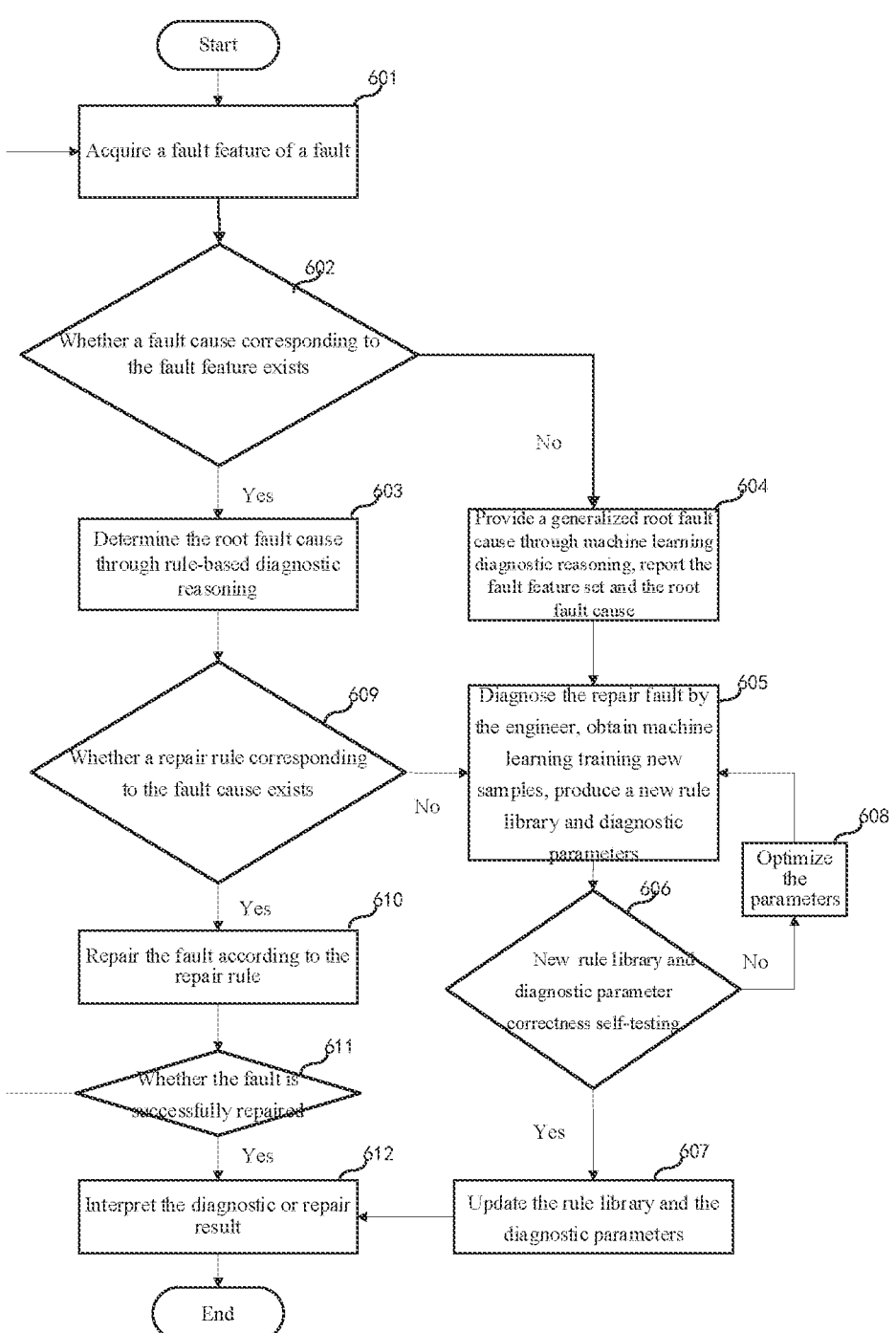
FIG. 6 is an interactive flowchart of a fault repair method according to an embodiment of the present disclosure.

In order to make the process of the fault repair method in the embodiment of the present application more clear, the present embodiment further provides a fault repair method as shown in FIG. 6, the specific steps are as follows:

In step 601, a base station acquires a fault feature of a fault.

In step 602, the base station determines whether a fault cause corresponding to the fault feature exists.

In one example, if no rule corresponding to the fault feature exists in the rule library, it is considered that no fault cause corresponding to the fault feature exists, the corresponding operations in steps 604 to 608 are performed; if a rule corresponding to the fault feature does exist in the rule library, it is considered that a fault cause corresponding to the fault feature exists, then step 603 and subsequent steps are performed.

In step 604, machine learning diagnostic reasoning provides a generalized root fault cause, and reports the fault feature set and the root fault cause.

Specifically, if no rule corresponding to the fault feature exists in the rule library, the base station considers that no fault cause corresponding to the fault feature exists, then the base station will start machine learning diagnostic reasoning to reason out a generalized root fault cause at this time, and report the fault feature set and diagnostic result to the engineer for decision.

In step 605, an engineer diagnoses a repair fault, sends a repair instruction to the base station, and the base station, after acquiring the repair instruction, according to the repair instruction, repairs the fault, and updates a repair rule library.

In particular, the base station may add repair rules by machine learning, and after obtaining repair instructions, generate new rules and diagnostic parameters by using the repair instructions as machine learning training new samples. Wherein, the machine learning reasoning is a learning algorithm with low complexity such as decision tree to perform rule training on complex fault samples with no explicit rule, and perform rule self-testing using a known root fault cause sample library to supplement new rules to the rule library.

In one example, according to the information collected by the diagnostic system, the engineer gives a new diagnostic result and stores it in the diagnostic system to form a repair instruction. After the engineer repairs the fault normally, the diagnostic system adds the new fault feature set and diagnostic result to the machine learning training samples, and the machine learning training generates new fault rules and diagnostic parameters.

In step 606, the correctness of the new rule library and diagnostic parameters is self-tested.

In one example, after the machine learning training generates new fault rules and diagnostic parameters, the base station performs self-testing on the new rules and diagnostic parameters using fault samples of known root fault causes, and if the self-testing is passed, step 607 is performed, that is, the new rules are added to the rule library and the machine learning diagnostic parameters are updated; and if the self-testing fails, step 608 is performed, that is, the machine learning parameters are optimized for retraining. Wherein, the machine learning reasoning uses low-complexity learning algorithms such as decision tree to train rules for complex fault samples without clear rules, and completes rule self-testing by using the sample library of known root fault causes, and supplements new rules to the rule library.

In step 603, the root fault cause is determined through rule-based diagnostic reasoning, wherein the reasoning algorithm used in rule-based diagnostic reasoning adopts a traditional forward reasoning algorithm, the fault feature set of the base station device is matched with the rule library, and the successfully matched rules are retained until all the rules in the rule library to be matched are matched, and finally the retained rules can diagnose the root fault cause.

In step 609, it is determined whether a repair rule corresponding to the fault cause exists.

In one example, the base station judges whether a repair rule corresponding to the fault cause exists according to the root fault cause determined in step 603. If it is judged that no repair rule corresponding to the fault cause exists, the base station executes the corresponding operations in steps 605 to 608. Specifically, if no corresponding repair rule exists, the root fault cause is reported to the man-machine interface, prompted to the engineer through the user interface, and the engineer repairs according to the root fault cause. After successful repair, the repair rule of the root fault cause is updated to the online repair rule library. If it is judged that a repair rule corresponding to the fault cause exists, then step 610 and subsequent steps are performed.

In step 610, according to the repair rule, the fault is repaired.

In particular, the base station gives a fault repair instruction to repair the fault after determining that the root fault cause can be repaired by combining the online repair rule library.

In step 611, whether the fault is successfully repaired is determined.

Wherein, if the fault has been repaired, step 612 is performed; if the fault is not successfully repaired, step 601 is performed again.

In step 612, the diagnostic or repair result is interpreted, wherein the interpretation is transmitted to a user interface for presentation via a man-machine interface.

In one example, after the above step 607, i.e., the rule library and diagnostic parameters are updated, the diagnostic results need to be interpreted as well.

In addition, the present application is not limited to intelligent online diagnosis of base station device faults, for example:

(1) The field of radio frequency algorithm fault diagnosis, for example, the CFR module, DPD module and other radio frequency algorithm fault diagnosis fields. By using this application, only appropriate function and performance feature marks need to be added to the CFR, DPD and other modules, and a corresponding rule library can be established according to working principle to realize online intelligent diagnosis of radio frequency algorithm faults.

(2) The field of baseband processing fault diagnosis, for example, intelligent fault diagnosis of the BBU (Building Base band Unit) system and other modules. By using this application, only appropriate function and performance feature marks need to be added in the corresponding module, and a corresponding rule library can be established according to the working principle to realize online intelligent diagnosis of baseband processing faults.

And (3) The field of hardware device fault diagnosis, for example, a transceiver unit and a radio frequency module. By using this application, only appropriate function and performance feature marks need to be added in the corresponding module, and a corresponding rule library can be established according to the working principle to realize online intelligent diagnosis of hardware device processing faults.

The embodiment of the present application is mainly to combine fault diagnosis with artificial intelligence technology, a method of intelligent diagnosis of base station device faults is proposed, which can break away from the limitations of external environment, instruments and meters, realize the functions of online diagnosis, prediction and repair of base station device faults, and has the functions of online self-learning and self-testing, thus greatly improving the intelligent level of operation and maintenance of the base station device and the application range of intelligent fault diagnosis of the base station device.

The steps of the above various methods are divided only for clarity of description, and the implementation can be merged into one step or some steps can be split into multiple steps, as long as the same logical relationship is included, and it is within the protection scope of this patent; and it is within the scope of this patent to add inconsequential modifications to or introduce inconsequential designs in the algorithm or in the flow, but not change the core design of its algorithm and flow.

Figures 7, 8:
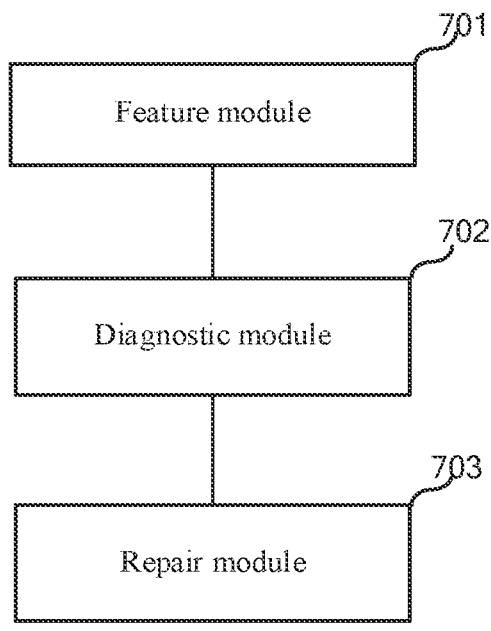
FIG. 7 is a structural schematic diagram of a fault repair apparatus according to an embodiment of the present disclosure.
FIG. 8 is a structural schematic diagram of an electronic device according to an embodiment of the present disclosure.

The embodiment of the present application further provides a fault repair apparatus, as shown in FIG. 7, including: a feature module 701, a diagnostic module 702, and a repair module 703.

Specifically, the feature module 701 is configured to acquire a fault feature of a fault; the diagnostic module 702 is configured to acquire a fault cause of the fault according to the fault feature; and the repair module 703 is configured to search whether a repair rule corresponding to the fault cause exists in a repair rule library; repair the fault according to the repair rule if the repair rule exists; and report the fault cause if the repair rule does not exist, and after a repair instruction is acquired, repair the fault according to the repair instruction, and update the repair rule library.

In one example, the fault features are divided into function and performance fault features. The function fault feature is configured to characterize the hardware state of each device function module; the performance fault feature is configured to characterize the signal processing performance of each device function module, wherein the function fault feature can be reported in real time, and the performance fault feature can be obtained based on the signal processing performance parameter of each device function module.

In one example, the feature module 701 obtains a performance fault feature by the following mode: the base station acquires a transceiving signal of the device function module; the base station identifies a configuration parameter of the transceiving signal; the base station calculates a performance index of the device function module according to the configuration parameter; and the base station obtains the performance fault feature according to the performance index.

Specifically, the diagnostic module 702 determines the device function module where the fault is located, and acquires a fault cause corresponding to the fault feature according to a diagnostic rule corresponding to the device function module in a preset diagnostic rule library, wherein, the diagnostic rule is a correspondence between a fault feature and a fault cause.

In addition, when no corresponding fault cause exists, self-learning is performed to reason out the fault cause according to an existing correspondence between a fault feature to the fault cause, the self-learning selects a decision tree algorithm or a support vector machine algorithm, and other machine learning algorithms with low complexity and strong interpretability may also be selected.

In one example, when the fault cause of the fault is acquired, rule-based diagnostic reasoning is performed and the root fault cause is defined, after defining the root fault cause, it is determined whether the root fault cause can be repaired online according to an online repair rule library, if a repair rule exists, a fault repair instruction is given, and finally whether the fault is repaired normally is detected, and a new round of detection diagnosis is performed. If no repair rule exists, the root fault cause is reported to a man-machine interface and is prompted to an engineer through a user interface, and the engineer repairs according to the root fault cause and uploads a repair instruction. The diagnostic system self-learns to generate a new repair rule according to repair instruction The correctness of the new repair rule is detected according to the fault, the fault cause and the new repair rule, if the new repair rule is detected to be correct, the repair rule of the root fault cause is updated to the online repair rule library, and if the new repair rule is detected to be incorrect, the parameters of the self-learning algorithm are adjusted, the new repair rule is regenerated and the correctness of the regenerated new repair rule is detected.

The fault repair apparatus provided by the embodiment can realize the functions such as online intelligent diagnosis and repair of the fault of the base station device, online self-learning and self-testing of complex faults, etc., can break away from the limitations of external computers, instruments and meters, and is widely used in laboratories, manufacturing, outfields and other scenes, thus greatly improving the intelligent level of operation and maintenance of the base station device and the user experience.

It can be easily found that the present embodiment is an apparatus embodiment corresponding to the above-described embodiment of the fault repair method, and the present embodiment can be implemented in conjunction with the above-described embodiment of the fault repair method. The relevant technical details mentioned in the above embodiment of the fault repair method are still valid in the present embodiment, and will not be repeated here in order to reduce repetition. Correspondingly, the relevant technical details mentioned in this embodiment may also be applied in the above fault repair method embodiment.

It is worth mentioning that each module referred to in the above embodiments of the present application is a logical module, and in practical applications, a logical unit may be a physical unit, a part of a physical unit, or a combination of a plurality of physical units. In addition, in order to highlight the innovative part of the present application, units that are not closely related to solving the technical problems raised in the present application are not introduced in the present embodiment, but this does not mean that there are no other units in the present embodiment.

An embodiment of the present application further provides an electronic device, as shown in FIG. 8, including at least one processor 801; and a memory 802 communicatively connected with the at least one processor 801; wherein the memory 802 stores instructions executable by the at least one processor 801, the instructions being executed by the at least one processor 801 to enable the at least one processor to perform the above-mentioned fault repair method.

Wherein, the memory and the processor are connected by a bus, which may include any number of interconnecting buses and bridges, the bus links together the various circuits of the one or more processors and memory. The bus may also link together various other circuits such as peripherals, voltage regulators, and power management circuits, which are well known in the art, and therefore, will not be described any further herein. A bus interface provides an interface between a bus and a transceiver. The transceiver may be one element or multiple elements, such as multiple receivers and transmitters, that provide a unit for communicating with various other apparatuses over a transmission medium. The data processed by the processor is transmitted over the wireless medium through the antenna, which further receives the data and transmits the data to the processor.

The processor is responsible for managing the bus and general processing, and may also provide various functions including timing, peripheral interfaces, voltage regulation, power management and other control functions. While the memory may be used for storing data used by the processor in performing operations.

The above product can execute the method provided by the embodiment of the present application, has corresponding function modules to execute the method and beneficial effects, technical details that are not described in detail in the embodiment can be referred to the method provided by the embodiment of the present application.

An embodiment of the present application also provides a computer-readable storage medium, storing a computer program. The computer program, when executed by the processor, implements the method embodiment described above.

Those skilled in the art will appreciate that all or part of the steps in implementing the method of the above embodiments can be performed by instructing related hardware through a program stored in a storage medium, including instructions for causing a device (which may be a single chip microcomputer, chip, etc.) or a processor to perform all or part of the steps of the method described in various embodiments of the present application. The aforementioned storage media includes a U disk, a removable hard disk, a Read-Only Memory (ROM), a Random Access Memory (RAM), a magnetic disk or an optical disk and other media capable of storing program codes.

The above embodiments are provided to those of ordinary skill in the art to implement and use the present application, those skilled in the art will appreciate that various modifications and changes may be made to the above-described embodiments without departing from the inventive concept thereof. Accordingly, the scope of the present disclosure should not be limited to the above-described embodiments, but should be accorded the full scope of the inventive features set forth in the claims.

What is claimed is:

1. A fault repair method, comprising:
acquiring a fault feature of a fault;
determining whether a fault cause corresponding to the fault feature exists, comprising:
  acquiring a device function module in which the fault is located; and
  acquiring, according to a diagnostic rule corresponding to the device function module in a preset diagnostic rule library, the fault cause corresponding to the fault feature,
  the diagnostic rule being a correspondence between the fault feature and the fault cause;
determining, upon a condition that a corresponding fault cause does exist, whether a repair rule corresponding to the fault cause exists;
repairing, upon a condition that the corresponding repair rule does exist, the fault according to the repair rule;
upon a condition that no corresponding repair rule exists:
  reporting the fault cause;
  after acquiring a repair instruction, repairing the fault according to the repair instruction; and
  updating a repair rule library.

2. The fault repair method of claim 1, further comprising:
obtaining, upon a condition that no corresponding fault cause exists, the fault cause by self-learning and reasoning according to an existing correspondence between a fault feature and the fault cause.

3. The fault repair method of claim 2, wherein the self-learning is implemented by a decision tree algorithm.

4. The fault repair method of claim 2, wherein the self-learning is implemented by a support vector machine algorithm.

5. The fault repair method of claim 1, wherein updating the repair rule library comprises:
performing, according to the repair instruction, self-learning to generate a new repair rule;
detecting, according to the fault, the fault cause and the new repair rule, correctness of the new repair rule;
updating, upon a condition that the new repair rule is correct, the repair rule library with the new repair rule; and
adjusting, upon a condition that the new repair rule is incorrect, a self-learning algorithm parameter, regenerating a new repair rule, and detecting correctness of the regenerated new repair rule.

6. The fault repair method of claim 1, wherein the fault feature comprises a function fault feature;
wherein the function fault feature is configured to represent a hardware state of each device function module; and the function fault feature is obtained by being reported by each device function module.

7. The fault repair method of claim 1, wherein the fault feature comprises a performance fault feature;
wherein the performance fault feature is configured to represent a signal processing performance of each device function module; and the performance fault feature is obtained according to a signal processing performance parameter of each device function module.

8. The fault repair method of claim 1, wherein the fault feature comprises:
a function fault feature and a performance fault feature;
wherein the function fault feature is configured to represent a hardware state of each device function module;
the performance fault feature is configured to represent a signal processing performance of each device function module;
the function fault feature is obtained by being reported by each device function module; and
the performance fault feature is obtained according to a signal processing performance parameter of each device function module.

9. The fault repair method of claim 8, wherein the performance fault feature is acquired by:
acquiring a transceiving signal of the each device function module;
identifying a configuration parameter of the transceiving signal;
calculating a performance index of the each device function module according to the configuration parameter; and
obtaining the performance fault feature according to the performance index.

10. An electronic device, comprising:
at least one processor; and
a memory communicatively connected with the at least one processor;
the memory storing instructions executable by the at least one processor, and the instructions being executed by the at least one processor to enable the at least one processor to execute a fault repair method of claim 1.

11. A non-transitory computer-readable storage medium storing a computer program which, when executed by a processor, implements a fault repair method of claim 1.

\* \* \* \* \*